(No Model.)
E. G. EBERHART.
PRESSER FOOT OPERATING DEVICE FOR SEWING MACHINES.
No. 390,071. Patented Sept. 25, 1888.
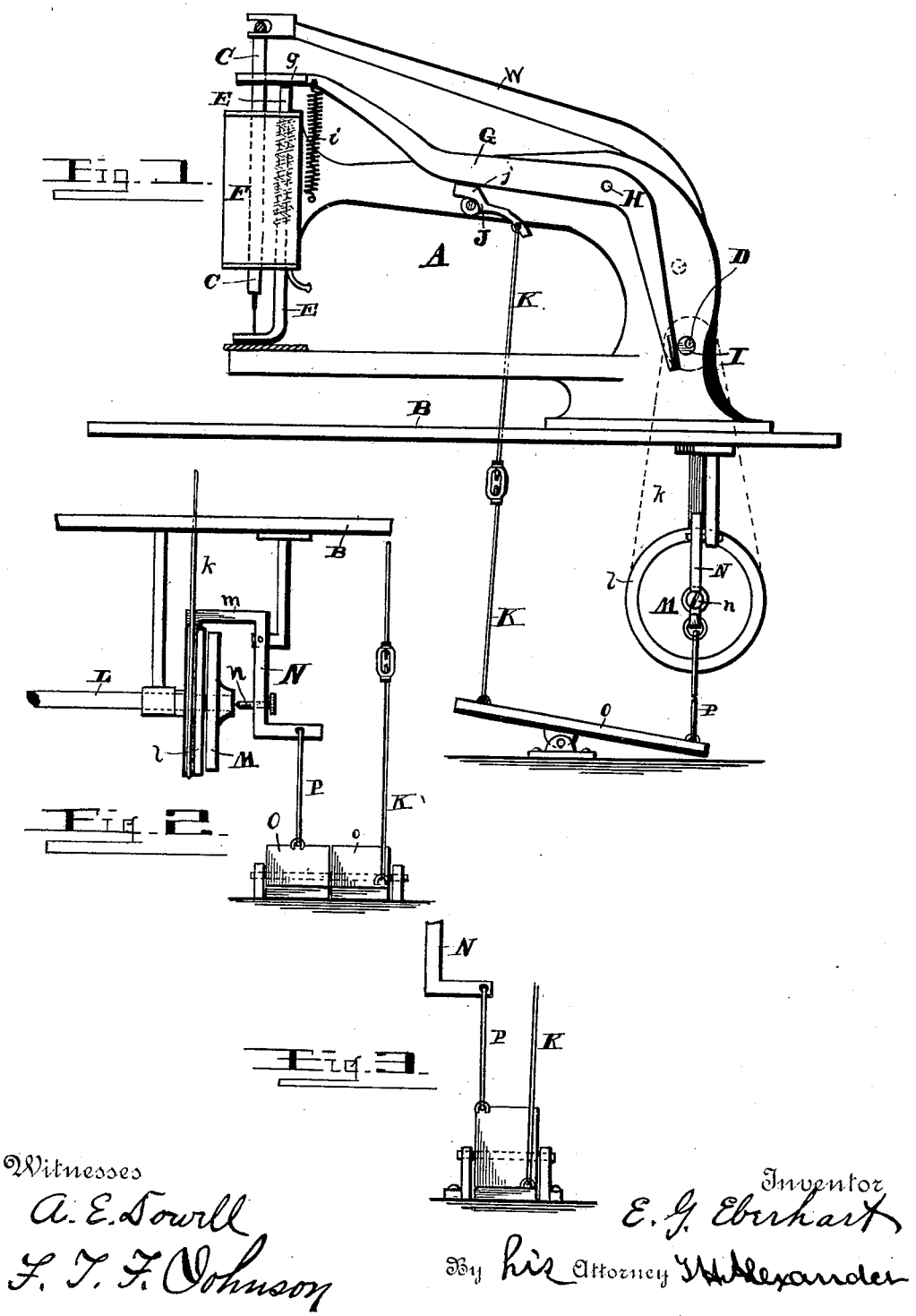
Witnesses
A. E. Dowell
F. F. F. Johnson
Inventor
E. G. Eberhart
By his Attorney J. H. Alexander

UNITED STATES PATENT OFFICE.

EVERETT G. EBERHART, OF MISHAWAKA, INDIANA.

PRESSER-FOOT-OPERATING DEVICE FOR SEWING-MACHINES.

SPECIFICATION forming part of Letters Patent No. 390,071, dated September 25, 1888.

Application filed March 29, 1888. Serial No. 268,796. (No model.)

*To all whom it may concern:*

Be it known that I, EVERETT G. EBERHART, of Mishawaka, in the county of St. Joseph and State of Indiana, have invented certain new and useful Improvements in Presser-Foot-Operating Devices for Sewing-Machines; and I do hereby declare that the following is a full, clear, and exact description thereof, reference being had to the accompanying drawings, and to the letters of reference marked thereon, which form part of this specification, in which—

Figure 1 is a detail side elevation of a sewing-machine having my improvements applied. Fig. 2 is a detail front elevation of the same. Fig. 3 is a detail of a modification.

This invention has for its object to improve the presser-foot-regulating devices in sewing-machines, being especially adapted for use with universal-feed and other manufacturing machines; and it consists in the novel construction and arrangement of parts, whereby the presser-foot can be released independently of the running of the machine, or simultaneously with the stopping of the latter, if desired, as will be clearly understood from the following description, when taken in connection with the accompanying drawings, and pointed out in the claims hereto appended.

Referring to the drawings by letter, A designates an ordinary sewing-machine; B, the supporting-stand thereof; C, the needle-bar operated by a pivoted arm, W, driven by a cam on a shaft, D, at rear of the machine, as usual; and E, the presser-foot bar. In the present instance the presser-foot bar is mounted in a revolving barrel, F, with which it turns to feed in any direction. The bar E is controlled by a spring secured in barrel F, which lifts the bar E from its work when released.

G represents an oscillating arm pivoted at H on the frame of the machine and extending forward to and above barrel F, where it is provided with a flat enlarged head, *g*, which impinges on the upper end of bar E and presses the latter down on its work. The head *g* is pressed against bar E by a coiled spring, *i*, secured to arm G and the machine-frame, as shown. The other end of arm G is bent down in position to be struck by a cam, I, on shaft D for imparting the necessary vibratory movements to arm G and the presser-foot when the machine is in operation.

J is an angular dog pivoted at its bend on the arm of the machine below arm G and in position to engage the latter when properly shifted. The machine illustrated is driven by a bolt, *k*, from a loose friction-pulley, *l*, on a shaft, L, journaled in a depending bracket on stand B, which is engaged by a shifting friction-pulley, M, on the shaft. The latter is thrown into engagement with pulley *l* by means of an angular lever, N, pivoted to a depending bracket of stand B, as shown. The lever N is provided with a set-screw, *n*, by which its engagement with pulley M can be regulated, and with a brake-arm, *m*, adapted to engage pulley *l*.

O *o* are two oscillating pedals mounted on proper supports below stand B. Pedal O has its forward or toe end connected by a pitman, P, with an outstanding arm of lever N to oscillate the latter to stop or start the machine; and it will be observed that the brake will be applied to or released from pulley *l* simultaneously with the engagement or disengagement of pulley M therewith. The heel or rear end of pedal *o* is connected by a sectional rod, K, with the arm of dog J, so that upon operating pedal *o* the dog can be shifted. When depressed, the knee *j* of dog J engages arm G and oscillates the latter, causing it to disengage cam I and release the presser-foot bar, which is instantly raised by its spring. When the dog is raised, the spring *i* causes the return of arm G to its normal position and depresses the presser-foot. It will thus be seen that the dog is shifted by foot, so that the operator has free use of his hands to manipulate the work, so that if desired he can release the presser-foot for crossing seams and turning the work without stopping the machine. However, the pedals O *o* being arranged on the same shaft, as shown, they can be operated independently or simultaneously, so that the pulleys *l* and M can be disengaged, brake *m* applied to pulley *l*, and the presser-foot released without the operator having removed his hands from the work.

In some cases it is preferable to consolidate pedals O *o*, making of them one pedal, as shown in Fig. 3, and attaching the toe end by means of a pitman with lever N, as shown, and the heel of said pedal by a sectional rod with the dog J. In this case the raising of the presser-foot becomes automatic and synchronous with the stopping of the machine—that is to say, the attention of the operator need be directed to but the starting and stopping of his machine. The action of the presser-foot takes care of itself automatically. It automatically lifts and drops with the stopping and starting of the machine and at the precise moment required. Connecting-rod K is so adjusted and set as to fully control the motion and time of the presser-foot without attention from the operator.

It is evident that this device may be attached to a dog, which raises the presser-foot bar directly without the intervention of arm G. Dog J may be so shaped that it will rise under the pressure of the spring which depresses the presser-foot. Upon depressing pedal o the cam end of the dog will raise the presser-foot against the spring, thus releasing the work as long as the heel of the pedal is depressed; or the dog could be raised by a spring, which would antagonize the action of rod K and pedal O. When the heel of the pedal is raised, the spring will hold the dog up and free from its bearing on the presser-foot bar. When depressed, it will antagonize and overcome the influence of such springs, and will raise the presser foot, as before described.

Having described my invention I claim—

1. The combination of the spring-controlled presser-foot bar, the pivoted oscillating arm G, depressing said foot-bar, and the spring for controlling said arm, with the pivoted angular dog J, located on the machine-arm between the pivot of arm G and the presser-foot, the rod K, and pedal o, all constructed and arranged to operate substantially in the manner and for the purpose described.

2. The combination of the sewing-machine having a spring-controlled arm for depressing the presser-foot bar, and the friction-pulleys or motor for driving the same, with the angular dog engaging said arm, the angular lever for starting or stopping said motor, and the devices, substantially as described, connected with said dog and lever, whereby the presser-foot can be released or depressed simultaneously with the starting or stopping of the machine, all constructed and arranged to operate substantially in the manner and for the purpose described.

In testimony that I claim the foregoing as my own I affix my signature in presence of two witnesses.

EVERETT G. EBERHART.

Witnesses:
JAMES DUSHANE,
JEANIE ANDERSON.